United States Patent [19]

Benson et al.

[11] Patent Number: 4,683,910

[45] Date of Patent: Aug. 4, 1987

[54] HIGH-SPEED PROTECTIVE CHECK VALVING FOR PRESSURE TRANSDUCERS AND THE LIKE

[75] Inventors: Richard A. Benson, Bedford; David H. Alden, Burlington, both of Mass.

[73] Assignee: MKS Instruments, Inc., Andover, Mass.

[21] Appl. No.: 821,508

[22] Filed: Jan. 21, 1986

Related U.S. Application Data

[63] Continuation of Ser. No. 607,384, May 4, 1984, abandoned.

[51] Int. Cl.[4] .............................................. F16K 17/28
[52] U.S. Cl. .................................... 137/519; 137/533; 137/533.25; 137/533.31; 251/368
[58] Field of Search ................ 137/519, 533.31, 519.5, 137/533.25, 533.21, 533.17, 533.11; 251/368

[56] References Cited

U.S. PATENT DOCUMENTS

| | | | |
|---|---|---|---|
| 919,155 | 4/1909 | Giffen | 137/533.31 |
| 1,072,673 | 9/1913 | Thelen | 137/533.31 |
| 1,740,770 | 12/1929 | Gray et al. | 137/519 |
| 2,853,094 | 9/1958 | Wexler | 137/533.31 |
| 3,441,051 | 4/1969 | Morse | 137/533.25 |
| 4,128,105 | 12/1978 | Follett | 137/519 |
| 4,196,886 | 4/1980 | Murray | 251/368 |
| 4,310,017 | 1/1982 | Raines | 137/519 |

*Primary Examiner*—Alan Cohan
*Assistant Examiner*—John A. Rivell
*Attorney, Agent, or Firm*—James E. Mrose

[57] ABSTRACT

Sudden increases in fluid pressure which could be injurious to the diaphragm and seals of a sensitive capacitive pressure transducer, or the like, are instantly protectively blocked or "checked" automatically by a miniature naturally-powered valve having a low-mass one-piece valve member or plug molded of elastomeric material which is shaped and disposed to be immediately propelled into guided tight line-contact seating and sealing as an abrupt pressure surge commences and then to hold such sealing only until the plug is unseated by gravity when either the pressure is rapidly lowered suitably in operation of the transducer or the diaphragm is slowly exposed to increased pressure after enough minute normal valve leakage takes place. A truncated conical valving surface is provided on a mid portion of the movable plug, for line-contacting with the narrow edge of a circular valve-body stationary seat, and tapered and cylindrical guide portions at opposite ends of the mid portion of the plug are trapped within and guided by surrounding inner surfaces of the valve body just upstream and downstream of the seat. Threadedly-united halves of the valve body may be adjustably telescoped to adjust the limits of travel of the valving plug member within them, and, thereby, to adjust or calibrate response characteristics of the valve.

1 Claim, 4 Drawing Figures

U.S. Patent    Aug. 4, 1987    4,683,910
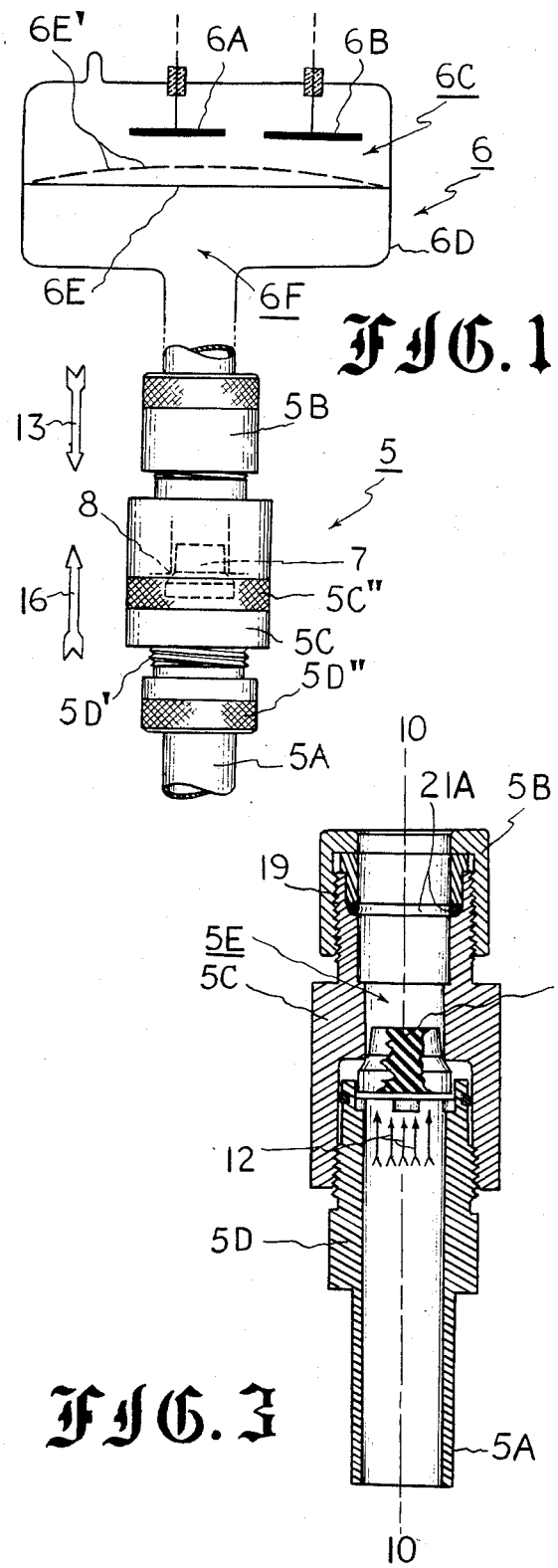
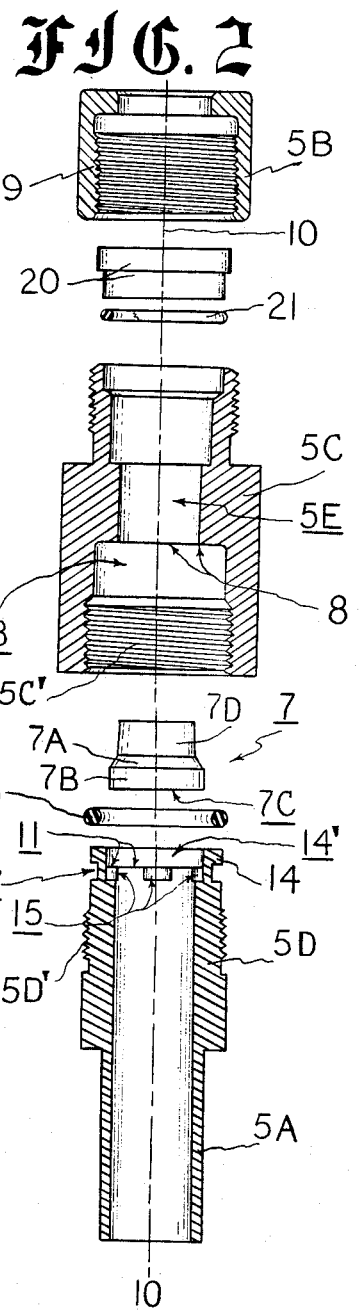
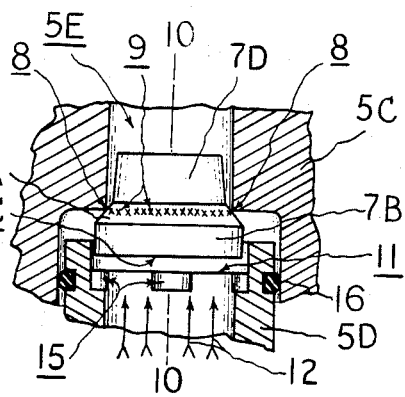

HIGH-SPEED PROTECTIVE CHECK VALVING FOR PRESSURE TRANSDUCERS AND THE LIKE

This is a continuation of co-pending application Ser. No. 06/607,384 filed on May 4, 1984, now abandoned.

BACKGROUND OF THE INVENTION

The present invention related to improvements in protective check-valving, and, in one particular aspect, to novel and improved check valves of uncomplicated low-cost miniaturized construction which respond instantly and automatically to abrupt high surges of fluid pressure by blocking and sealing against the transmission of such pressures to vulnerable structure such as the diaphragm and seals of a capacitance manometer, the improved valves being readily adjustable in response, having self-cleaning characteristics, and operating without externally-applied power.

Fluid valves have of course been long known in many and varied forms, including that of the so-called "check" valve type in which fluid flow is essentially limited to one direction, as by a reciprocatable or hinged valve member, and sometimes involving spring-biasing or electromagnetic actuation. However, when the applications involve such demanding combined requirements as extremely rapid responses, very tight and sustainable valving closures, adjustability of response, instant and positive closures with but minute gaseous flow, and wholly automatic high-speed operation not dependent upon power from an auxiliary source, it becomes necessary to improve upon what has been commonly available. For example, such requirements present themselves in respect of valving which might protect delicate pressure-sensitive devices against sudden large pressure bursts, as in the case of sensitive capacitance manometers whose thin diaphragms and relatively frail seals can be damaged when there is an almost explosive inrush of air upon a breaking open of a very low sensed pressure to a relatively high ambient atmospheric pressure. If injury during such episodes is to be forestalled, the measurement inlet port to such a manometer must be blocked tightly near the very onset of the pressure transient, well in advance of the very brief time it takes the potentially troublesome ambient air pressure to assault the manometer from outside. That allows virtually negligible leeway for detection of abrupt pressure changes and for speedy actuation of valving members in opposition to their inertia. Moreover, the blockage or sealing must be of exceptional quality and integrity, else leakage will prevent the intended protective effects from being realized. Nor is it enough that the blockage be effected and sustained upon sudden increase of the pressure; it must also be possible for the valve to open widely very quickly and thereby allow the associated manometer to perform its intended pressure measurements during processing operations in which there are fluctuations or alternations between high- and low-pressure conditions. Preferably, such valving should be adjustable in response, to serve needs of different processing operations.

SUMMARY OF THE INVENTION

In accordance with certain aspects of the present teachings, it is recognized that check valving operating at sufficiently high speed, and with the needed quality of sealing, to protect a capacitance manometer or the like against damage from bursts of gas pressure, may be uniquely fashioned with a lightweight free movable valving member or plug shaped to be fluid-propelled instantly from a gravity-induced "open" rested condition into a line-contact active "closed" sealing relation to a body seat as suddenly-increased fluid pressure seeks to propagate itself through the valve body and into the vulnerable manometer. A preferred embodiment of the invention involves a valve body having two aligned ported parts threadedly engaged in an adjustable telescopically-enveloping relation to a one-piece freely-movable valving or plug member which is molded of elastomeric material, the plug member having a truncated conical valving portion disposed for seating and line-contacting engagement with a stationary seat formed as a circular narrow edge about a passageway through one of the body parts. That conical valving portion merges with a slightly-tapered upper guiding end which is always mated loosely within that passageway and prevents the freely-movable plug member from becoming so cocked as to be likely to seat itself imperfectly; at its opposite lower end, the plug member exposes a relatively broad-area surface to impingement by onrushing gas, such that it will be propelled upwardly against gravitational forces and its conical portion will seat and seal with the stationary seat. When the external pressure matches or falls below that within the manometer, gravity quickly induces the plug member to drop from its seated "closed" orientation, thereby opening the manometer for measurements of low pressures; that fall in pressure may occur in the normal course of operation of the manometer, or the inside and external pressures may equalize gradually and without risk of damage to the manometer as the result of relatively slow leakage which is permitted through the check valve. Response of the valve can be adjusted by tightening the threadedly-connected body parts and thus restricting allowable travel of the plug member housed within them.

Accordingly, it is one of the objects of the present invention to provide unique and advantageous protective check valves of uncomplicated, reliable, inexpensive and adjustable precision construction which can instantly block passage of potentially troublesome effects of fluid-pressure surges and immediately restore operative open-valve conditions when required.

It is a further object to provide protective high-speed check-valving, for capacitance manometers and the like, wherein a lightweight movable resilient plug member is shaped and disposed to be swiftly fluid-propelled into a seated sealing which effectively blocks transmission of hazardous bursts of fluid pressure, a normally-open condition being maintained or restored by gravity.

BRIEF DESCRIPTION OF THE DRAWINGS

Although the aspects and features of this invention which are considered to be novel are expressed in the appended claims, further details as to preferred practices and as to further objects and features thereof may be most readily comprehended through reference to the following detailed description when taken in connection with the accompanying drawings, wherein:

FIG. 1 pictorially illustrates a high-speed protective check valve in association with a schematic representation of a capacitance manometer, the movable valving member and its seat being characterized by broken linework;

FIG. 2 shows the elements of an improved protective check valve in an "exploded" relationship, with certain of the elements being shown in cross-section;

FIG. 3 is a longitudinal cross-section of the same check valve, with the elements in an assembled relationship and the movable plug member being only partly sectioned; and FIG. 4 is a detailed fragment, partly in cross-section and on an enlarged scale, of an interior portion of the same valve, including the plug member, its seat, and guide provisions.

DETAILED DESCRIPTION OF THE PREFERRED EMBODIMENTS

Having reference to the drawings, wherein like reference characters designate identical or corresponding components and units throughout the several views, and, more particularly to FIG. 1 thereof, one embodiment of a high-speed protective check valve, 5, is shown to include axially-aligned inlet and outlet couplings, 5A and 5B, respectively, at opposite ends of a main valve body member 5C. That valve is disposed in the gaseous-fluid line between a capacitance manometer 6 and some site at which gas pressure is to be monitored, such as an evacuated site being maintained at very low pressure in connection with the processing of electronic semiconductor items. The example of a capacitance manometer 6 which was chosen for discussion purposes is a sensor of a single-sided absolute-pressure type in which capacitor electrodes 6A and 6B are disposed within an evacuated and sealed "reference" pressure side 6C of the envelope 6D and are connected externally into measurement equipment (not shown) which responds to such of their capacitive relationships as are influenced by pressure-induced deformations of a relatively thin metallic diaphragm 6E. Depending upon what pressures are communicated to the "sensed" pressure side 6F of the unit, the diaphragm 6E may deflect to a greater or lesser extent, as suggested by the broken linework 6E', and related capacitance measurements will characterize those pressures. Certain of the structural niceties by which such manometers are designed to have needed sensitivities are also potential sources of difficulty, as in the case of the thin diaphragm 6E; in particular, that diaphragm must be resiliently deformable enough to respond repeatedly in a predictable way to both slight and major pressure changes and yet must not be allowed to exceed its elastic limits nor to impact with nearby structure nor to overstress its supports and seals. There is an exceptionally high degree of vulnerability when the sensed pressure bursts abruptly to a high value, typically and quite frequently when the system undergoing measurement is suddenly vented to atmospheric pressure. On such occasions, the diaphragm can be violently shocked and distended, with strong likelihood of injury and malfunctioning, especially after such operational punishment has been inflicted repeatedly.

The rapidity with which the large pressure bursts occur suggests that any useful protection should be approached through electronically-controlled high-speed electromagnetic valving, a solution which would entail costly and complicated equipment, as well as reliance on a power supply. However, it is found that the naturally-powered check valve 5, which operates entirely without an auxiliary supply of energy and depends instead upon gravity and forces developed by gases within it, can reliably afford adequate protective checking at appropriate speed and with tight closures.

For those demanding purposes, the needed valving is implemented by a small and lightweight movable plug member 7 which is molded of elastomeric material and has a truncated conical mid-section designed to seat intimately in line-contact relationship against a narrow circular edge 8 between stepped inner surfaces of the valve body 5C. That mid-section, 7A, and the narrow band 9 along which it engages the seat edge 8 about a third of the way down from its narrower end, are shown in enlargement in FIG. 4, with the essentially line-contact band 9 being designated by a row of small cross marks. Slope angle of that truncated conical section is preferably about 45 degrees in relation to the central longitudinal axis 10—10 of the plug member and valve assembly, that relatively steep slope being adequate to guard against the plug's becoming inadvertently wedged into and stuck in its seat.

The illustrated check-valve embodiment is one which is intended to be mounted with its longitudinal axis 10—10 essentially vertical, so that the small plug member 7, exceedingly lightweight as it is, will normally gravitate to rest in a lowered position (not illustrated) against an annular inner shoulder 11 (FIGS. 2 and 4) of the inner valve body part 5D integrally associated with the inlet coupling 5A. A lower cylindrical portion, 7B, of the plug member is disposed to rest against that shoulder and to present its planar circular bottom surface, 7C, in a perpendicular relation to the direction of any onrushing burst of air or other gas, the latter being characterized by arrows 12 (FIGS. 3 and 4). When the system site at which pressure is being measured is being evacuated or otherwise reduced in pressure, related gas flow through the check valve is in the direction of arrow 13 (FIG. 1), clearing the resting plug member 7 by flowing downwardly around it first through annular clearance spaces between cylindrical portion 7B and a surrounding sleeve 14 at the upper end of body part 5D and then through an array of hemi-cylindrical recesses 15 bored downwardly from the annular shoulder 11. However, when there is a sufficiently abrupt and intense reversal of gas flow, into the manometer in the direction of arrow 16 (FIG. 1), as will occur when an evacuated measurement site is suddenly vented to atmospheric pressure, the burst of air impacts forcefully against blunt end 7C of the plug member as characterized by arrows 12 (FIGS. 3 and 4), creating a strong lifting force which at once propels the lightweight plug member upwardly at high speed into a firmly-seated tightly sealed relationship with seat edge 8. That action takes place with such rapidity and sureness that the manometer is not required to withstand the main brunt of the pressure burst, the protective blocking or checking occurring well before the manometer can be unduly shocked with pressure.

Molded plug member 7 is a single-piece expression not only of the aforementioned truncated conical mid-section valving portion 7A and a lower cylindrical base portion 7B but also of an upper guide portion 7D. Preferably, that guide portion tapers slightly narrower in the upward direction, and it is long enough to remain well mated within the bore 5E of body portion 5C even when the plug member is at its lowermost possible position. That mated and guiding relationship insures that the plug member cannot become so tilted or cocked that it might catch and not immediately seat properly when thrust forcefully upwardly by an onrushing burst of gas. The small plug member 7 may typically be only about 0.48 inch in maximum lowermost diameter and 0.36 inch in minimum uppermost diameter, with an overall length of about 0.325 inch; total weight, when molded of a 70-durometer hardness fluoroelastomer such as that commercially available under the commercial designation "Viton-A", is merely about three thousandths of a pound. Other materials or combinations of materials may be used effectively, although it is preferred that the valving surface be of a resiliently-deformable material such as a common rubber or elastomeric plastic, allowing for tight seating under but slight pressure. In addition, the flexing elastic character of the valving surface tends to self-clean or oppose build-up of contaminants which could impair sealing. The aforementioned taper angle of about 45 degrees is highly satisfactory in respect of a good non-wedging line-contact seal being made between the truncated conical mid-portion 7A of the plug member and the narrow edge seat 8 in the upper body portion 5C. At much shallower angles, the plug member cannot be expected to center itself as well in its seat, and the sealing may vary as to position and be less even. Seat edge 8 is so proportioned in diameter that it tends to engage and seal with the truncated conical valving portion 7A of the plug at about one-third of the way from its narrower end to its larger-diameter end, as represented by numeral 9 in FIG. 4, it being found that centering and little sticking occurs under those conditions. Were the taper angle significantly steeper, the plug member could tend to deform and wedge itself within the seat, making release and opening of the valve uncertain. In the latter connection, it should be noted that although the valve closes as the result of the force of onrushing gas against the larger end 7C of the plug member, it drops and opens when the downward force of the mass it exhibits under influence of gravity is greater than the amount by which the upward force of gas pressure from below exceeds the downward force of internal manometer gas pressure from above. Effective areas of the plug member exposed to those gas pressures are essentially the same, such that differentials in pressure, not area, affect the valve openings. Too light a plug member tends to open sluggishly, however.

Sensitivity of valve operation is affected controllably by adjustment of the axial distance through which the valve plug member 7 must move between its lowermost (open) and uppermost (closed) position. For those purposes, the upper and lower valve body members 5C and 5D are mated by way of their cooperating internal and external threadings 5C' and 5D', respectively, and they can thereby be more drawn together or separated, axially, by appropriate manipulation of their knurled exterior surfaces 5C'' and 5D'', respectively. The cylindrical lower portion 7B of plug 7 fits somewhat loosely within a cooperating cylindrical recess 14' (FIG. 2) in the sleeve 14 at the upper end of body member 5D and, when the valve is in an "open" condition with the plug at its lowermost position, the edges of the planar bottom 7C of the plug rest upon the aforementioned cut-out annular shoulder 11. Therefore, depending upon how fully the two body members are mated together, the plug member will have a selectably shorter or longer distance to travel axially upward along axis 10—10 before it engages seat edge 8 and effects "closing" of the valve and "checking" of a pressure burst. The sensitivity adjustment is in the nature of a micrometer manipulation, in that, before the valve is installed, the operator rotates the body members in direction to draw them together about the plug member inside until shaking along axis 10—10 no longer yields the rattling sound which is otherwise caused by the plug member's freedom to move, and then an opposite-direction rotation of one body member relative to the other by a predetermined angular amount draws them apart by a predetermined axial amount which frees the plug member from an entrapped "zero" and unmovable position so that it may move axially by that predetermined axial amount. Fineness of the threading determines how much angular movement will produce predetermined axial separation of the body member, and, in turn, the sensitivity of the valve to pressure changes. In one embodiment, each one-third back-off turn from "zero" was effective to increase the "checking" pressure requirement by about one torr, for example.

Leakproof coupling of the relatively-rotatable body members is assured by an O-ring seal 16 fitted in a groove 17 at the upper end of body member 5D, the upper body member 5C having an internal bore 18 with a cylindrical surface by which the O-ring is compressed to block leakage. Coupling of the threaded upper end of body member 5C with a manometer inlet or the like is facilitated by an internally-threaded nut 19 which forces a hollow sleeve 20 against a sealing O-ring 21 rested upon a sloping shoulder 21A spreading radially from near the upper end of member 5C; when the O-ring 21 is sufficiently compressed, it is distended radially inward and thus seals against a manometer inlet tube (not shown) mated closely within it.

The valve installation is preferably essentially vertical, although operation off vertical up to about 45 degrees is possible, with some degradation in performance. Where gravity alone is not to be relied upon for the automatic opening, a spring, magnetic or other biasing may be introduced to normally urge the plug member away from the seat. A one-piece molded plug member, such as has been described and shown, is preferred, and its truncated conical valving portion can readily be molded very precisely and entirely without mold lines which would otherwise tend to interfere with optimum seating and sealing. In other constructions, the truncated conical portion of the valving member may instead be spherically, rather than conically, contoured, although a full ball member would of course exhibit undesirable mold lines and would therefore not be a good substitute. The illustrated planar bottom surface of the plug member may alternatively be concave, and the entire member may be hollowed out from that end to achieve lightness with broad area against which the onrushing gas can impinge to develop the checking action. A single-piece molded plug is preferred, with no seam lines except at the intended corners and edges, but useful results could be attained with a comparable multi-piece plug member and/or with a non-resilient core piece carrying a sheath of elastomeric sealing material along the truncated valving section of the plug.

Accordingly, it should be understood that the specific embodiments and practices herein described have been presented by way of disclosure rather than limitation, and that various modifications, combinations and substitutions may be effected by those skilled in the art without departure in spirit or scope from this invention in its broader aspects and as set forth in the appended claims.

What we claim as new and desire to secure by Letters Patent of the United States is:

1. A high-speed protective check valve for pressure transducers and the like comprising a valve body having two body members provided respectively with inlet and outlet ports communicating with an interior fluid flow passageway which extends along a substantially vertical axis therethrough, one of said body members having therein one part of said passageway and having a narrow circular edge defining a valve seat normal to said axis, said valve seat being formed by stepped inner surfaces of said one of said body members which merge at substantially 90 degrees at the site of said narrow circular edge, a free single-piece molded valving member of elastomeric material of about 70 durometer hardness contained within and mechanically unconnected in relation to said body and guided about its exterior for short reciprocating movements along said axis between an upper flow-blocking position in which an exterior valving portion thereof engages and seals with said seat and a lower position below said upper position and at which said member is axially displaced from said seat and fluid may flow around said member and through said seat and said passageway, said exterior valving portion of said valving member having a truncated conical exterior configuration without mold lines tapering symmetrically about said axis and with a slope of about 45 degrees from a larger cylindrical lower end of said valving member to a smaller upper end portion which is of lesser diameter than said seat and fits therethrough to allow said seat to make essentially a line-contact seating and sealing with said exterior portion, said larger cylindrical end of said valving member having a blunt lower end surface substantially normal to said axis and being fitted relatively loosely radially within another part of said passageway in an accommodating recess at the inner upper end of the other of said body members, said recess having an annular shoulder at the bottom thereof and around the fluid passageway therethrough disposed for interference with edges of said blunt lower end surface of said valving member to establish said lower position for said valving member, said shoulder having relief passageways therethrough to permit by-pass of fluid around said valving member when said blunt end surface rests on said shoulder, and said blunt end surface being in position within said recess to have relatively large amounts of onrushing fluid headed upwardly toward said seat impinge perpendicularly upon it and thereby propel said valving member upwardly along said axis until said exterior portion seats and seals itself in an essentially line-contact engagement with said seat, said narrow circular edge defining said valve seat being of a diameter which causes it to engage said exterior valving portion at about one-third of the distance down from said smaller end portion to said larger cylindrical end when said valving member is seated therewith, and said smaller end portion of said valving member tapering narrower upwardly at a relatively small angle from said exterior valving portion to the free upper end thereof and being of sufficient axial length and diameter to extend through said seat irrespective of the axial position of said valving member and to prevent the valving member from tilting excessively about said axis asnd becoming jammed, said valving member being urged downwardly toward said shoulder by gravity but being of such light weight in relation to forces developed by impingements of said upwardly-onrushing fluid upon said larger end thereof and by greater pressures below said valving member than above it as to allow said valving member to be propelled upwardly into a seated and closed condition rapidly when the onrush commences and, thereby, to protect against passage of significant bursts of fluid upwardly therethrough, said two body members being mated by way of complementary external and internal threading of substantially constant diameter coaxial with said axis and said passageway and being relatively rotatable to adjust the axial separations between said first and second positions and, thereby, the sensitivity of said check valve to pressures which will close the valve.

* * * * *